United States Patent
Becker

(10) Patent No.: US 9,280,862 B2
(45) Date of Patent: Mar. 8, 2016

(54) CHARGING STATION AND METHOD FOR SECURING A CHARGING PROCESS OF AN ELECTRIC VEHICLE

(71) Applicant: Gernot Becker, Dortmund (DE)

(72) Inventor: Gernot Becker, Dortmund (DE)

(73) Assignee: RWE AG, Essen (DE)

( * ) Notice: Subject to any disclaimer, the term of this patent is extended or adjusted under 35 U.S.C. 154(b) by 273 days.

(21) Appl. No.: 13/958,124

(22) Filed: Aug. 2, 2013

(65) Prior Publication Data

US 2013/0338824 A1 Dec. 19, 2013

Related U.S. Application Data

(63) Continuation of application No. PCT/EP2011/072215, filed on Dec. 8, 2011.

(30) Foreign Application Priority Data

Feb. 9, 2011 (DE) .......................... 10 2011 010 809

(51) Int. Cl.
*G06F 17/00* (2006.01)
*G07F 15/00* (2006.01)
*B60L 11/18* (2006.01)
*H02J 7/00* (2006.01)

(52) U.S. Cl.
CPC ........... *G07F 15/005* (2013.01); *B60L 11/1825* (2013.01); *H02J 7/0027* (2013.01); *B60L 2230/16* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC ............. G06Q 10/087; G06Q 10/0875; G60L 11/187; G60L 11/185
USPC ........................... 235/375, 376; 320/109, 137
See application file for complete search history.

(56) References Cited

U.S. PATENT DOCUMENTS

| | | | | |
|---|---|---|---|---|
| 5,462,439 | A * | 10/1995 | Keith ............................. | 320/109 |
| 8,025,526 | B1 * | 9/2011 | Tormey et al. ................ | 439/528 |
| 2005/0104555 | A1 | 5/2005 | Simmonds-Short | |
| 2010/0013433 | A1 | 1/2010 | Baxter et al. | |

(Continued)

FOREIGN PATENT DOCUMENTS

| | | |
|---|---|---|
| CN | 2449296 Y | 9/2001 |
| DE | 4213405 A1 | 10/1993 |

(Continued)

OTHER PUBLICATIONS

Rent-a-Bike Scheme; Wikipedia; 36 pages; Feb. 8, 2011.

*Primary Examiner* — Daniel St Cyr
(74) *Attorney, Agent, or Firm* — Reinhart Boerner Van Deuren P.C.

(57) ABSTRACT

Method for securing a charging process of a vehicle (30) at a charging station (2), comprising outputting a random or pseudorandom first release code to a user on the charging-station side, releasing the charging current on the charging-station side, receiving a second release code that is input by a user on the charging-station side, comparing the first release code with the second release code on the charging station-side, and interrupting the charging current on the charging-station side in the event of a positive comparison result.

7 Claims, 2 Drawing Sheets

(56) References Cited

U.S. PATENT DOCUMENTS

2010/0013436 A1* 1/2010 Lowenthal et al. ............ 320/109
2010/0274656 A1* 10/2010 Genschel et al. .......... 705/14.27

FOREIGN PATENT DOCUMENTS

| DE | 202010005543 U1 | 11/2010 |
| DE | 102009030092 A1 | 12/2010 |
| DE | 102010011162 A1 | 2/2011 |
| JP | 2007114968 A | 5/2007 |
| JP | 2010028913 A | 2/2010 |
| JP | 2010110044 A | 5/2010 |
| WO | WO 2010100081 A2 | 9/2010 |
| WO | WO 2010115927 A1 | 10/2010 |

* cited by examiner

CHARGING STATION AND METHOD FOR SECURING A CHARGING PROCESS OF AN ELECTRIC VEHICLE

CROSS-REFERENCE TO RELATED PATENT APPLICATIONS

This patent application is a continuation of pending PCT Patent Application No. PCT/EP2011/072215, filed Dec. 8, 2011, which claims the benefit of German Application No. 102011010809.2, filed Feb. 9, 2011, the entire teachings and disclosure of which are incorporated herein by reference thereto.

FIELD OF THE INVENTION

The subject-matter concerns a charging station and a method for securing a charging process of a vehicle, in particular an electric vehicle, at a charging station.

BACKGROUND OF THE INVENTION

The use of electric vehicles promises a solution to many problems presently associated with private transport: the power necessary to drive these can be created in an environmentally-friendly manner, no exhaust gases are produced by the actual vehicle, the noise level is reduced and the electric drive itself in principle allows a higher efficiency than an engine relying on the combustion of fossil fuels.

In order for electric vehicles to be more widely used, however, simple and geographically widespread opportunities must be provided for energy charging, similar to the familiar filling station network for liquid fuels. This also raises questions of deducting a payment and securing the charging process. At present, although an infrastructure for a power supply is at least geographically broadly in place, the energy consumption from a plug socket cannot be easily broken down by respective user and determined promptly, if necessary limited, and billed in situ.

In order to make power filling stations that can be used by anyone, that is to say publicly accessible charging stations, practical, these must be as easy to operate as petrol pumps for liquid fuels and also allow the similar possibility of limitation and billing for the charging. From the point of view of the vehicle user, therefore, as little as possible should change.

With known safety mechanisms that prevent the connector being pulled out, control of the mechanical interlocking takes place from the vehicle. The charging station also monitors if the connector has been plugged into the vehicle. When the connector is pulled out, the charging current is interrupted so that there is no danger from the charging connector as a result of the high electrical potential present on this.

However, this can also lead to a deliberate pulling out of the charging connector from the vehicle resulting in an interruption to the charging process. In particular in the event that the charging process has already been paid for prior to charging this should be avoided. In this case the user also wants the vehicle to charge at the charging station for the duration paid for. This is of particular relevance when charging with direct current. There is as yet no calibrated method with which during charging with direct current the quantity of energy obtained can be measured. Rather, when charging with direct current a charging time is measured. It must therefore be ensured that the charging time previously paid for is actually used to charge the vehicle.

SUMMARY OF THE INVENTION

For the stated reasons, the object of the subject-matter was to provide a method for charging a vehicle, including charging-station side securing of the charging process.

This object is achieved according to a first aspect by a method according to the teaching herein.

It is proposed that on the charging-station side a random or pseudorandom first release code can be output to the user. The first release code can be a sequence of numbers or a sequence of characters or another code. A release code is pseudorandom if it is not generated according to a particular pattern, but cannot be predicted in advance by a potential aggressor. This can for example also be a code from a ring buffer. The first release code can also be generated by a random generator.

Once the first release code has been output, on the charging-station side the charging current can be released. Preferably, prior to release of the charging current, a further check is made that the charging cable is correctly inserted in the vehicle. This is necessary if it has to be ensured that no danger to the user results from the charging cables. Once the charging has been released, the charging process takes place. This is preferably determined by a duration which the user decides on and pays for in advance. This applies in particular for a charging process with direct current.

During the charging process or at the end of the prepaid duration of the charging process the user will want to be able to remove the charging cable from the vehicle. For this reason it is proposed that a second release code input by the user is received on the charging-station side. Preferably the user will have noted the first release code, output previously, or this will have been indicated to him by the charging station. Then the user can enter the second release code, which is identical to the first release code.

In order to check that the second release code corresponds to the first release code, on the charging-station side the first release code is compared with the second release code. For this it is necessary that the first release code output on the charging-station side is stored in the charging station. This storage is preferably secured against unauthorized access. Here the first release code can for example be stored in an encrypted manner in the charging station. The comparison takes place by checking if the first release code is identical to the second release code input.

If the two release codes are identical, on the charging-station side the charging current is interrupted. The charging process can then be ended.

Inputting the second release code and comparing the second release code with the first release code output, ensures that only the person who initiated the charging process can interrupt the charging process. Only this user was made aware of the first release code.

According to an advantageous exemplary embodiment it is proposed that prior to the step of release of the charging current on the charging-station side an interlocking signal bringing about an interlocking of a charging cable to the vehicle is sent to the vehicle.

This can take place wirelessly, for example via WLAN, Bluetooth, ZigBee, infrared, Near Field Communication or similar. It is also possible for the communication to take place via the charging cable itself. Here, for example, it is possible, that the charging cable apart from the wires that are necessary for power transmission also has wires that are used for communication. There may be eight of these wires, for example, with which communication with the CAN-Bus of the vehicle can take place. It is also possible for the communication to take place via the power line. For this a Power-Line-Communication (PLC) protocol can preferably be used.

It is also proposed that on the charging-station side a check is made that the vehicle has correctly responded to the interlocking signal and that the charging cable has actually interlocked. This can take place by the vehicle sending the charging station a confirmation signal that the charging cable has interlocked with the vehicle. Receipt of this confirmation signal can be monitored in the charging station. Only once the signal has been received does release of the charging current take place.

Once the process has ended, that is to say once the correct second release code has been input and the charging current has been interrupted, the charging cable must be unlocked from the vehicle. To this end it is proposed that after the step of interrupting the charging current, an unlocking signal is sent from the charging station to the vehicle. This can be transmitted to the vehicle in the same way as the interlocking signal. Then on the charging-station side a check can be made that the vehicle has actually unlocked the charging cable.

As already mentioned at the outset, prior to step a) on the charging-station side a charging time is determined. This is in particular the case when charging using direct current. When charging with a direct current, for example, a charging voltage of 400 volts and a charging current of 170 amperes can be used. In this case, as an example, within 30 minutes the battery will be 80% charged. With direct current charging charge regulation is performed by the charging station. Therefore the charging station must also be responsible for when the charging process is ended.

In particular if charging is dependent upon a charging time advance payment is desirable. It is therefore also proposed that prior to step a) on the charging-station side a payment process is performed. By way of example, a user can indicate a charging time and pay the necessary costs directly at the charging station. This payment can, for example, be made by credit card or an EC card. In this case a user must often enter a PIN code, in order to release the payment. Therefore the charging station in this case already has a display and a PIN pad. The first release code can for example be output via this display. Other outputs are also possible, however. And the PIN pad, which is also used for the payment process, can additionally be used for input of the second release code.

It is also proposed that steps a) to b) are performed at the start of a charging process. That is to say that the charging process is at least initiated by steps a) to b).

At the end of the charging process steps c) to e) are preferably performed. Thus a charging process can be ended by at least performing steps c) to e).

As already explained above payment for the charging process can take place in advance. This can take place for example by paying using a credit card or an EC card. In this case it is often advantageous if the user is issued with a payment receipt, including in respect of the tax regulations. For this reason the charging station often has a receipt printer. The receipt printer can in an advantageous manner also be used to output the first release code. Output can also be on a display, for example the display which is also used for payment. Finally, it is possible to inform the user of the release code by means of an electronic message. For example, it is possible for the user to indicate his mobile telephone number and for the first release code to be sent as a text message to his mobile telephone. An e-mail can also be used to send the user the first release code.

As soon as the user wishes to interrupt the charging process, he must input the second release code. It is proposed that the second release code is input on the charging-station side or vehicle side by the user. With charging-station side input, the abovementioned PIN pad can be used. It is also possible for the second release code to be sent by text message via a mobile telephone network to the charging station. In this case, at the charging station for example a mobile telephone number or another telephone number can be indicated to which the user can send a text message. It is also possible to use an app to send the second release code to the charging station.

Where input is on the vehicle side the user can for example use a keypad installed in a vehicle. Voice input on the vehicle side would for example also be possible. For this, by way of example, the speech recognition device of the integrated telephone on the vehicle side could be used. This device is already suitable for recognizing voice input of numbers. Thus it could also be used, for example, to input the second release code on the vehicle side.

Communication of the interlocking and/or unlocking signal and communication of the charging parameters and the charge regulation itself calls for a communications link and a communications protocol between the charging station and the vehicle. To this end it is proposed that communication between the charging station and the vehicle is via the charging cable, preferably using a CHADEMO protocol. The CHADEMO protocol is used for charge control and can also be used for communication of interlocking and unlocking signals. Communication between charging station and vehicle can also take place via PLC. Communication can take place via the power line. Communication can in particular take place via the DC line.

At the latest at the end of a charging process the charging station should be able to be used by other users. In order to prevent a user blocking a charging station, when this is no longer charging his vehicle, it is proposed that, upon expiry of the charging time, independently of the input of the second release code, the charging cable is unlocked on the vehicle side. For this, by way of example, the charging station can send the unlocking signal to the vehicle upon expiry of the charging time paid for, whereupon the vehicle unlocks the charging cable. The unlocked charging cable can for example be signaled to third parties by a visual notification. This ensures that the charging station can still be used even if a previous user has not released the charging cable by inputting the second release code, even though the charging time has expired.

As already explained above, the first release code can be generated in the charging station. This can take place, for example, by reading out from a ring buffer or by a random generator. On the other hand, it is also possible that in the charging station the first release code is received from a control centre. For this, by way of example, the charging station can send a request signal to the control centre, whereupon in the control centre a release code is determined, calculated or read out, and then transmitted to the charging station. Here the transmission can for example take place in an encrypted manner. Transmission by means of Powerline-Communication is similarly possible. On the other hand other transmission paths, such as for example via GSM, UMTS, WLAN, EDGE, Wi-Fi or similar are possible. Finally, cabled transmission such as via DSL and/or using the Internet protocol is possible.

A further subject matter is a charging station according to the teachings herein.

In this connection the charging station is provided with output means configured to output a random or pseudorandom first release code to a user. The output means can be a display, a receipt printer or similar. The output means can also be associated with communication means, allowing the first release code to be sent to a telephone or an e-mail account of a user. Then the first release code can be sent electronically to the user.

The charging station is also provided with control means configured to release the charging current. The control means can for example communicate via the charging cable, or by radio, with the vehicle. The control means are preferably configured to communicate via the CHADEMO protocol. The control means are further configured to release or to block the connection of the charging cable to a charge controller and the supply system. In this way, via the control means the charging current can be released or blocked. The control means can take the form of a suitably programmed microcomputer.

The charging station also has reception means, configured to receive a second release code input by a user. The reception means can for example consist of a number pad/character pad or a PIN pad, via which the user can manually input a numerical code/character code. The reception means can also be connected with the communication means, in order to receive a text message from the user, in which the user provides the second release code. Speech recognition means can also be provided allowing the user to input the second release code using his voice either directly at the charging station or via his telephone.

Comparison means can be provided, which compare the first release code with the second release code input. This can be a microprocessor, which allows a comparison between two sequences of numbers or two sequences of characters. For this purpose, the charging station can include a buffer memory which holds the first release code output until a comparison with the second release code takes place.

Finally, the comparison means have an operative connection with the control means. This operative connection serves at least to disconnect the charging current in the event of a positive comparison result. To this end a disconnection of the charge controller and of the charging cable from the supply network can take place.

Apart from the abovementioned means the charging station can also have additional communication means for communication with the vehicle. The communication means can be provided in particular for sending an interlocking and unlocking signal and for checking the interlocking of the charging cable to the vehicle. The communication means can also have an operative connection with the control means and so the communication means also allow communication with the vehicle, e.g. via the CHADEMO protocol or a PLC protocol or another protocol with which communication is possible via a power line or also a pilot line.

The features of this method and the device can be freely combined with one another. In particular, the features of the dependent claims, including in the absence of the features of the independent claims, on their own or freely combined with one another can also individually constitute an inventive step.

The abovementioned method can also be performed as a computer program or as a computer program stored on a storage medium. In this connection on the charging-station side a microprocessor can be suitably programmed to perform the respective process steps by means of a computer program.

BRIEF DESCRIPTION OF THE DRAWINGS

The invention is explained in more detail in the following using a drawing showing an exemplary embodiment. The drawing shows as follows.

DETAILED DESCRIPTION OF THE INVENTION

Figure 1:
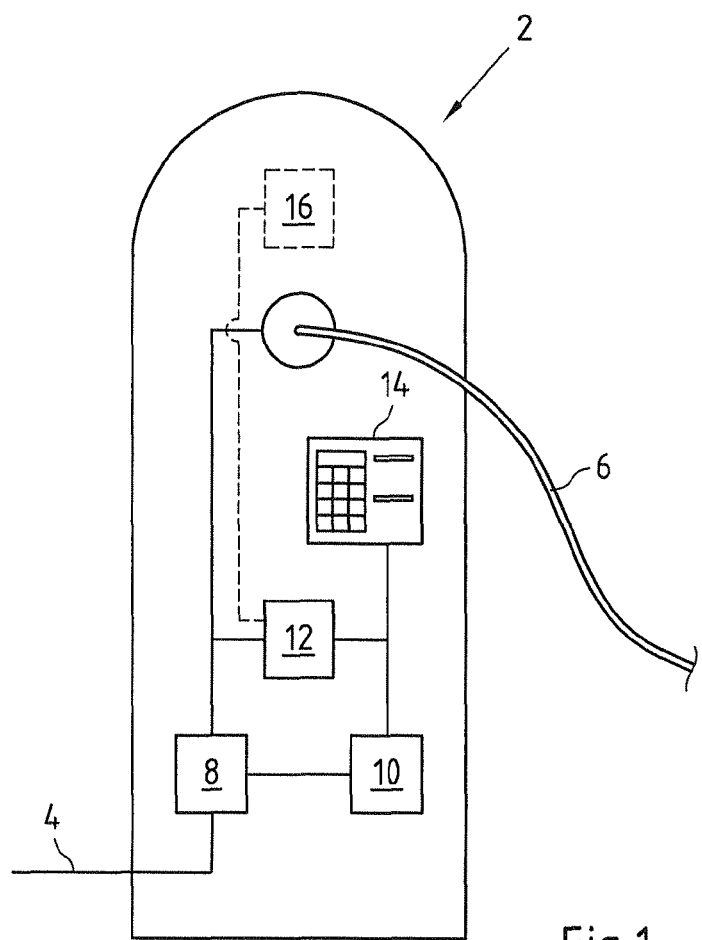
FIG. 1 a schematic view of a charging station according to an exemplary embodiment.

FIG. 1 shows a charging station 2. The charging station 2 is connected with a supply network 4. A charging cable 6 arranged on the charging station 2 can be connected via a charge controller 8 with the energy supply network 4. The charge controller 8 is controlled via a control means 10 and can in particular be driven by the control means 10 in order to release and disconnect the charging current.

Furthermore, in the charging station 2 a microprocessor 12 is provided, which on the one hand has communication means, in order to communicate with the vehicle via the charging cable 6 and on the other hand controls the communication between the control means 10 and an input/output terminal 14.

Finally a communication means 16 can be connected with the control means 12. The communication means 16 can on the one hand communicate wirelessly with the vehicle via a communication circuit such as for example a radio chip, e.g. using near-field communications. Furthermore, the communication means 16 can be configured to communicate via a cabled connection or wirelessly with a control centre, for example via DSL or via GSM/UMTS/EDGE/LTE.

Figure 2:
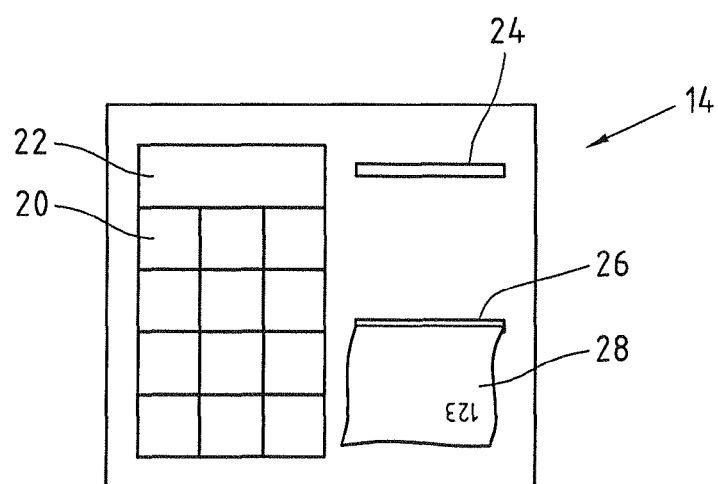
FIG. 2 a schematic view of a device for inputting a release code and for outputting a release code.

The input/output terminal 14 is shown in more detail in FIG. 2. As can be seen from this, the input/output terminal 14 has a PIN pad 20. Via this PIN pad 20 a user can enter numbers and/or characters. In addition, a display 22 is provided, via which the user can check his entries and input requirements and other information can be communicated to the user.

The input/output terminal 14 has a card reader 24, with which for example an EC card or a credit card can be read. A microprocessor (not shown) in the input/output terminal 14 thus allows a payment process with a credit card or an EC card to be controlled.

Finally, the input/output terminal 14 has a receipt printer 26. The receipt printer 26 can on the one hand print a payment receipt and on the other a second release code on a receipt 28.

Figure 3:
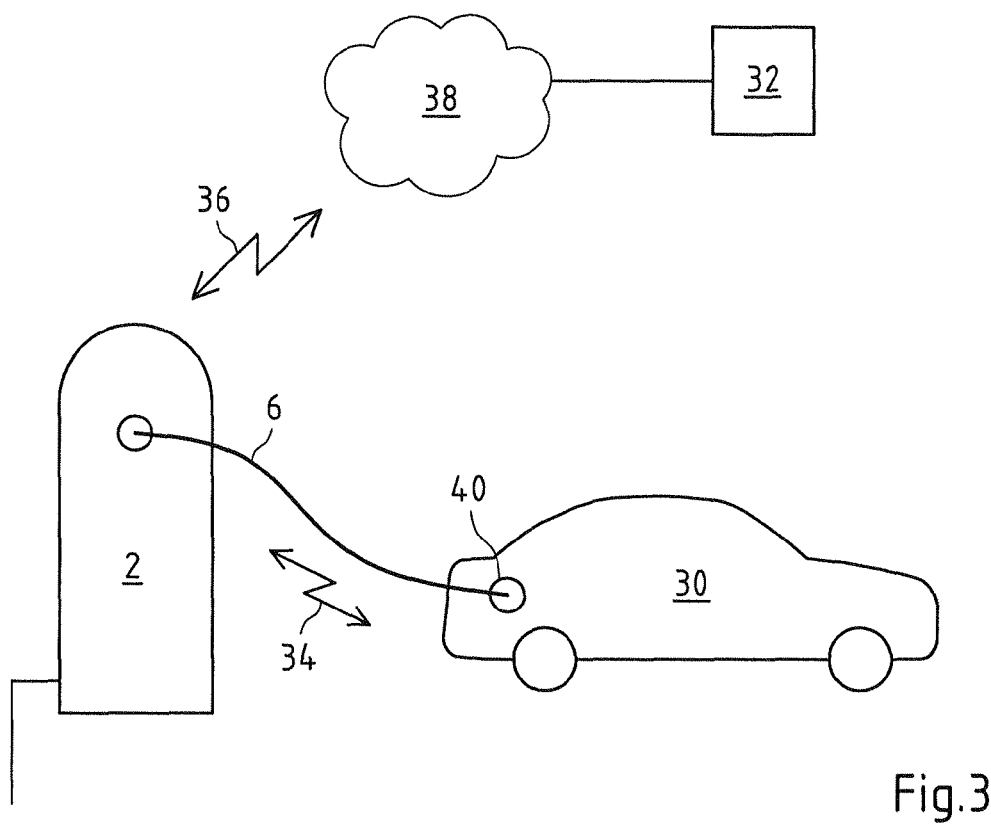
FIG. 3 a schematic view of a system with a charging station, a vehicle and a control centre.

FIG. 3 shows a system with a charging station 2, a vehicle 30 and a control centre 32. FIG. 3 also shows radio communication paths 34 and 36. The radio communication path 34 allows for example radio communication between the charging station 2 or the communication means 16 arranged therein and the vehicle 30, for example via WLAN, Bluetooth, ZigBee, DECT or similar.

The radio communication path 36 allows communication between the charging station 2 and the control centre 32. For this purpose the radio communication path 36 can for example be a GSM-/UMTS-/LTE link. This connecting path may also, at least in part, use the Internet 38.

Figure 4:
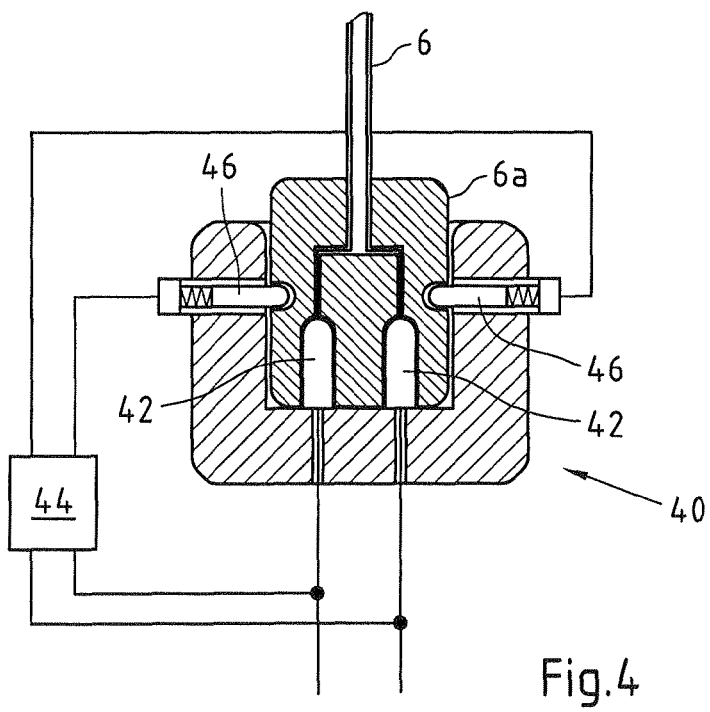
FIG. 4 a detailed view of a vehicle-side interlocking device.

FIG. 4 shows an interlocking device 40, which can be arranged in a vehicle 30, in order to interlock a charging cable 6 or a charging cable connector 6a. The interlocking device 40 has contacts 42, which are connected with the wires of the charging cable 6. Here for example contacts 42 for power lines and contacts 42 for communication lines can be provided. The two contacts 42 shown serve merely as examples.

A communication means 44 is also provided in the interlocking device 40 and the communication means 44 can be a communication processor, which on the one hand can communicate with the vehicle 2 via the charging cable 6, or can also communicate by radio via the radio communication path 34.

Finally, mechanical latches 46 are provided, which can be operated by electric motor. The mechanical latches 46 can engage with grooves in the connector 6a and thereby lock the connector 6a in the interlocking device 40. The latches can also unlock the connector 6a, by being moved out of the grooves of the connector 6a.

In order to charge the vehicle 30 a user drives the vehicle 30 to a charging station 2. The charging station 2 is preferably a quick charging station, which charges using direct voltage. Here, a voltage of 400 Volts at a current of 170 Amperes can be applied via the charging cable 6 for example. The charging cable 6 is preferably installed in a fixed manner at the charging station 2 and has a connector 6a, which can be inserted into the interlocking device 40 of the vehicle 30. The user plugs the connector 6a into the interlocking device 40 of the vehicle 30 and then goes to the input/output terminal 14 of the charging station 2.

The user then uses the pin pad 20, guided by notifications on the display 22, to select a desired charging time, for example 30 minutes. The display 22 tells the user the costs of the charging process which he can then pay. To do so, by way of example, the user inserts his EC card into the card reader 24 and then enters his PIN code via the PIN pad 20. After confirmation of the payment process a payment receipt 28 is printed out via the receipt printer 26. In addition or on the payment receipt 28 a first release code can be printed.

It is also possible, by means of the communication means 16 to send a text message to a telephone of a user, containing the release code.

Once the payment process has been completed and the release code output, by means of the microprocessor 12 an interlocking signal is sent via the charging cable 6 to the vehicle 30. Transmission via the radio communication path 34 is also possible. As soon as the interlocking device 40 or the communication means 44 of the interlocking device 40 receives the interlocking signal, they control the mechanical latches 46 so that they interlock the connector 6a.

Successful interlocking of the connector 6a is transmitted by the communication means 44 to the charging station 2 either via the charging cable 6 or the radio communication path 34. Confirmation of the interlocking is received in the charging station in the microprocessor 12. Once the interlocking has been confirmed, the microprocessor 12 controls the control means 10 in such a way that the control means releases the charging current via the charge controller 8. To this end a connection between the energy supply network 4 and the charging cable 6 is created.

Then, the microprocessor 12 monitors how long the charging process lasts. If the charging time has elapsed without any user input, then an unlocking signal is transmitted to the vehicle 30 via the microprocessor 12. Transmission takes place in the same way as transmission of the interlocking signal. The unlocking signal causes the connector 6a in the interlocking device 40 to be released. A release of the connector 6a can be signaled visually at the charging station 2.

On the other hand, it is possible that the connector 6a either remains locked in the interlocking device 40 beyond the charging time and must be released, or that the user wishes to unlock the charging cable 6 during the charging time. In this case the user approaches the charging station 2 and inputs a second release code via the PIN pad 20. The user has preferably retained the receipt 28 and can thus read from this the first release code previously output and then input it. The release code input is transmitted from the input/output terminal 14 to the microprocessor 12. The microprocessor 12 stores the previously output first release code and this is compared with the second release code input by the user. In the event of a positive comparison result the microprocessor 12 transmits a release signal to the vehicle 30, whereupon the charging cable connector 6a is unlocked from the interlocking device 40 and can be removed.

It is also possible for the first release code not to be generated in the charging station 2, but received from a control centre 32. To this end, following completion of the payment process, the charging station 2 can send a request signal to the control centre 32 via the radio communication path 36. The control centre 32 answers with a first release code, which is received by the communication means 16 in the charging station 2 and can be output via the display 22.

With the help of the method described, a charging process can be protected from deliberate interruption. A charging time that has been paid for can be guaranteed by the charging station, since a charging cable cannot readily be removed from the vehicle, until the charging time paid for has elapsed or the person entitled to do so has ended the charging process.

The invention claimed is:

1. Method for securing a charging process of a vehicle at a charging station defining a charging-station side comprising:
   a0) determining on the charging-station side a charging time or carrying out a payment process;
   a) outputting on the charging-station side a random or pseudorandom first release code to a user;
   a1) sending from the charging-station side to the vehicle an interlocking signal to cause an interlocking of a charging cable to the vehicle;
   b) releasing a charging current on the charging-station side;
   c) receiving on the charging-station side a second release code that is input by a user;
   d) comparing on the charging-station side the first release code with the second release code;
   e) interrupting the charging current on the charging-station side in the event of a positive comparison result;
   e1) sending from the charging-station to the vehicle an unlocking signal to cause an unlocking of the charging cable from the vehicle;
   f1) unlocking the charging cable on the vehicle upon expiration of the charging time independently of the input of the second release code.

2. Method of claim 1, wherein steps a) to b) are performed at the start of a charging process and that steps c) to f1) are performed at the end of the charging process.

3. Method of claim 1, wherein the first release code is generated in the charging station and output by the charging station via one of a receipt printer, a display or an electronic message to the user.

4. Method of claim 1, wherein the second release code is input on the charging-station side or the vehicle by the user.

5. Method of claim 1, wherein the communication between charging station and the vehicle takes place via the charging cable, using one of a CHADEMO protocol or using a Power-Line-Communication (PLC) protocol.

6. Method of claim 1, wherein the first release code is generated in the charging station or is received in the charging station from a control centre.

7. Charging station for vehicles, comprising:
   means configured for determining a charging time or for processing payment;
   output means configured to output a random or pseudorandom first release code to a user;

control means configured to release a charging current and for transferring to a vehicle an interlocking signal to cause an interlocking of a charging cable to the vehicle;

reception means configured to receive a second release code input by a user;

comparison means configured to compare the first release code with the second release code;

wherein the comparison means have an operative connection with the control means such that in the event of a positive comparison result the control means interrupt the charging current; and wherein the control means are configured for transferring to the vehicle an unlocking signal to cause an unlocking of the charging cable from the vehicle, such that upon expiration of the charging time the charging cable is unlocked on the vehicle independently of the input of the second release code.

\* \* \* \* \*